US008703263B2

(12) United States Patent
Goubard

(10) Patent No.: US 8,703,263 B2
(45) Date of Patent: Apr. 22, 2014

(54) ADHESIVE COMPOSITION FOR SELF-ADHESIVE LABEL AND ITEM INCLUDING THE SAME

(75) Inventor: David Goubard, Compiegne (FR)

(73) Assignee: Bostik S.A., La Plaine Saint Denis (FR)

( * ) Notice: Subject to any disclaimer, the term of this patent is extended or adjusted under 35 U.S.C. 154(b) by 161 days.

(21) Appl. No.: 13/056,949

(22) PCT Filed: Jul. 30, 2009

(86) PCT No.: PCT/FR2009/000955
§ 371 (c)(1),
(2), (4) Date: Feb. 25, 2011

(87) PCT Pub. No.: WO2010/012906
PCT Pub. Date: Feb. 4, 2010

(65) Prior Publication Data
US 2011/0162782 A1  Jul. 7, 2011

(30) Foreign Application Priority Data

Jul. 31, 2008  (FR) ..................................... 08 04367

(51) Int. Cl.
*B32B 9/00*  (2006.01)
*B41M 5/00*  (2006.01)
*B32B 7/12*  (2006.01)
*C08F 12/02*  (2006.01)
*C08F 36/00*  (2006.01)

(52) U.S. Cl.
USPC ................... 428/41.3; 428/195.1; 428/355 R; 526/346; 526/335

(58) Field of Classification Search
USPC ................. 428/41.3, 195, 355, 195.1, 355 R; 526/346, 335
See application file for complete search history.

(56) References Cited

U.S. PATENT DOCUMENTS 5,663,228 A   9/1997  Sasaki et al.
6,025,071 A * 2/2000  Cameron et al. ....... 428/355 RA

FOREIGN PATENT DOCUMENTS

WO   WO 99/20709      4/1999
WO   WO 2007/019042   2/2007

OTHER PUBLICATIONS

De Groot et al., "Determination of Fringe Order in White-Light Interference Microscopy," Applied Optics, vol. 41, No. 22, pp. 4571-4578 (2002).
International Search Report for International Application No. PCT/FR2009/000955, mailed Dec. 18, 2009.

* cited by examiner

*Primary Examiner* — William Cheung
(74) *Attorney, Agent, or Firm* — Hunton & Williams LLP

(57) ABSTRACT

The present invention relates to a pressure-sensitive hotmelt adhesive composition suitable for sticking permanent-tack self-adhesive labels to any type of smooth or rough surface, an item comprising said adhesive composition, and the method of preparing said item.

10 Claims, No Drawings

ADHESIVE COMPOSITION FOR SELF-ADHESIVE LABEL AND ITEM INCLUDING THE SAME

This is the U.S. National Stage application of International Patent Application No. PCT/FR2009/000955, filed Jul. 30, 2009, the disclosure of which is hereby incorporated by reference in its entirety.

FIELD OF THE INVENTION

The present invention involves a hot melt adhesive composition suitable for sticking permanent tack self-adhesive labels to any type of smooth or rough surface support, an item comprising said adhesive composition, as well as methods for preparing the item.

TECHNOLOGICAL BACKGROUND OF THE INVENTION

Hot Melt adhesives (or HM) are solid substances at room temperature which contain neither water nor solvent. They are applied in the molten state and solidify during cooling, thereby forming a joint which ensures attachment of the substrates to be assembled. Certain hot melts are formulated to impart the support on which it is coated, relative hardness without any tack. Other hot melts provide relative softness and significant tack to the support. These other hot melts are designated as "Hot Melt Pressure Sensitive Adhesives" (or HMPSAs) and are widely used for making self-adhesive labels.

Pressure sensitive adhesives (also-called self-adhesive glues or PSAs) are substances giving the support on which it is coated immediate tackiness at room temperature (often designated as tack), which allows them to be instantaneously adhered to a substrate under the effect of a slight and short pressure.

So-called permanent grade PSAs are widely used for making self-adhesive labels which are attached on items for the purpose of showing information (such as a bar code, a name, a price) and/or for decorative purposes.

The PSAs are generally applied by continuous coating methods over the whole of the surface of a printable supporting layer of large dimensions consisting of paper or of film of a polymeric material with one or more layers. The adhesive layer which covers the printable supporting layer is itself covered with a protective layer (often designated as "release liner"), for example consisting of silicone film or paper. The obtained multilayer system is generally packaged by winding it up in the form of wide reels having a width up to 2 meters and a diameter up to 1 meter, which may be stored and transported.

This multilayer system may subsequently be converted into self-adhesive labels which may be applied by the final user by means of transformation methods which include the printing of desired information and/or decorative elements on the printable face of the supporting layer, and then their cutting out into the desired shape and dimensions. The protective layer may easily be removed without modifying the adhesive layer which remains attached on the printable supporting layer. After separation of its protective layer, the label is applied at a temperature ranging from 0° to 50° C. on the item to be coated either manually, or with labelers on automated packaging lines.

The PSAs, because of their high tack at room temperature, allow the label to be rapidly adhered or attached to the item to be coated, which is suitable for obtaining significant industrial production rates.

Nevertheless, depending on the surface condition of the item, i.e. depending on its roughness level, depending on the formulation of the composition of the adhesive used and depending on the quality of the support of the label, a self-adhesive label does not behave in the same way over time. Before labeling, edge rolling problems (curling) involving poor positioning of the label on the item at the machine outlet may be observed. After labeling, problems of detachment of the edges of the label (in the form of a halo or "haloing") may also be observed. These problems are detrimental to proper application and proper hold of the label during the lifetime of the article.

SUMMARY OF THE INVENTION

Thus, the first object of the present invention is to propose an adhesive which allows a label to be permanently adhered onto an item, such as a package and/or a container for example glass bottles or plastic flasks, and which further provides the possibility of improving the hold of the labels, as well as avoiding edge rolling problems (curling) or edge detachment problems (haloing) of the self-adhesive label before, during and after labeling, and this regardless of the roughness of the labeled surface.

A more specific object of the present invention is also to provide a transparent self-adhesive label with which a so-called "no label look" item may be obtained, i.e. an item on which the label is invisible and where only the prints are apparent. With this goal, the initially transparent self-adhesive label before being applied on the item becomes invisible at the surface of the item within a time period compatible with the making and delivery process before its marketing (a so-called "wet out" time), while not having any detachment of the edges (haloing) and this regardless of the surface roughness of the item on which the label is applied.

In every case, the object of the present invention is also to obtain an item on which the self-adhesive label remains detachable at the surface of the item for at most 36 hours and preferably for 24 hours or still for 12 hours. This implies the possibility of completely separating the label from the item to which it is attached, without leaving any residues of adhesive at the surface of the latter, so as to facilitate a method for recycling labeled items when they are non-compliant.

The first object of the invention is therefore a pressure sensitive hot melt adhesive composition comprising:
  from 20 to 50% by weight of a polymeric portion A) comprising a mixture of styrene block copolymers consisting in i) 10 to 100% by weight of one or more radial or linear triblock copolymers of the Styrene-Butylene-Styrene (SBS), Styrene-Isoprene-Styrene (SIS), Styrene-Ethylene/Butylene-Styrene (SEBS), Styrene-Isoprene/Butylene-Styrene (SIBS), Styrene-Ethylene/Propylene-Styrene (SEPS) type and ii) less than 90% by weight, preferably from 0% to 80% of one or more diblock copolymers of the Styrene-Butadiene (SB) or Styrene-Isoprene (SI) or Styrene-Ethylene/Butylene (SEB) or Styrene-Isoprene/Butylene (SIB) or Styrene-Ethylene/Propylene (SEP) type, the overall styrene unit content of said mixture being less than or equal to 35%, preferably comprised between 10 and 25% by mass;
  from 50 to 80% of a resin portion consisting of a liquid portion B and of a solid portion C;
  the liquid portion B) accounts for 25 to 100% by weight of the mixture B+C and has a minimum softening point, measured according to the ASTM E 28 standard or the DSC method, in the range from −10° C. to 50° C., preferably comprised between 5° C. and 20° C., said liquid portion comprising (B1) comprising one or more tackifying resins selected from liquid polar compounds, optionally mixed with (B2) comprising at least one polar oil, preferably a benzoate oil;

the solid portion C) accounts for 0 to 75% by weight of the B+C mixture and has a softening point measured according to the ASTM E 28 standard above 70° C., preferably comprised between 90 and 150° C., and consists of one or more polar or apolar solid tackifying resins;

said portion B+C comprising from 0 to 40% by weight of apolar resin, preferably from 5 to 35% by weight, and from 60% to 100% by weight of polar resin, preferably from 65% to 95% by weight.

Preferably, in the adhesive composition according to said invention, the liquid portion B only consists of the portion B1 comprising one or more tackifying resins selected from polar liquid compounds based on rosins or their ester derivatives of rosins.

Notably, the object of the invention is a pressure sensitive hot melt adhesive composition (HMPSA is preferred) comprising:

from 20 to 50% by weight of a polymeric portion A) comprising a mixture of styrene block copolymers consisting in i) 10 to 100% by weight of one or more radial or linear triblock copolymers of the Styrene-Butylene-Styrene (SBS), Styrene-Isoprene-Styrene (SIS), Styrene-Ethylene/Butylene-Styrene (SEBS), Styrene-Isoprene/Butylene-Styrene (SIBS), Styrene-Ethylene/Propylene-Styrene (SEPS) type and ii) less than 90% by weight, preferably from 0% to 80% of one or more diblock copolymers of the Styrene-Butadiene (SB) or Styrene-Isoprene (SI) or Styrene-Ethylene/Butylene (SEB) or Styrene-Isoprene/Butylene (SIB) or Styrene-Ethylene/Propylene (SEP) type, the overall styrene unit content of said mixture being less than or equal to 35%, preferably comprised between 10 and 25%;

from 50 to 80% of a resin portion consisting of a liquid portion B and of a solid portion C;

the liquid portion B) accounts for 25 to 100% by weight of the mixture B+C and has a minimum softening point, measured according to the ASTM E 28 standard or the DSC method, in the range from −10° C. to 50° C., preferably comprised between 5° C. and 20° C., said liquid portion comprising (B1) comprising one or more tackifying resins selected from liquid polar compounds, based on rosins or on their ester derivatives of rosins, optionally mixed with (B2) comprising at least one polar oil, preferably a benzoate oil: optionally completed with one or more hydrocarbon apolar oils of the naphthene or paraffin type; advantageously only consisting of the portion (B1);

the solid portion C) accounts for 0 to 75% by weight of the B+C mixture and has a softening point measured according to the ASTM E 28 standard above 70° C., preferably comprised between 90 and 150° C., and consists of one or more apolar solid tackifying resins or terpene resins resulting from the polymerization of terpene hydrocarbons in the presence of Friedel-Crafts catalysts and modified by the action of phenols;

said portion B+C comprising from 0 to 40% by weight of apolar resin, preferably from 5 to 35% by weight, and from 60% to 100% by weight of polar resin, preferably from 65% to 95% by weight.

Preferably in the adhesive composition according to the invention, the solid tackifying resins of portion C are selected from apolar resins.

Preferably in the adhesive composition according to the invention, said portion A accounts for 25% to 45% by weight of the adhesive composition and the portion B+C accounts for 55 to 75% by weight of the adhesive composition.

The second object of the invention is a multilayer system comprising:
- an adhesive layer, consisting of the preferred HMPSA as defined above
- a printable supporting layer adjacent to said adhesive layer, consisting of a non-porous material, either transparent or not;
- a protective layer adjacent to said adhesive layer.

The second object of the invention is a multilayer system comprising:
- an adhesive layer, consisting of the HMPSA as defined above
- a printable supporting layer adjacent to said adhesive layer, consisting of a non-porous transparent material;
- a protective layer adjacent to said adhesive layer.

Preferably in the multilayer system, the supporting layer consists of a transparent polymer film with one or more layers, preferably a single-layer polymeric oriented polypropylene (OPP) or polyethylene (PE) film.

Preferably, in the multilayer system, the printed face of the single layer film is in contact with the adhesive layer.

The third object of the invention is a self-adhesive label which may be obtained by cutting out the multilayer system as defined above, wherein the amount of adhesive at the surface of the support ranges from 10 to 70 $g/m^2$ preferably from 15 to 25 $g/m^{2.}$ The fourth object of the invention is an item for which the outer surface roughness Ra, measured with an interferometric microscope is greater than or equal to 0.1 µm, preferably greater than or equal to 1 µm, coated with a self-adhesive label as defined above.

Preferably, the item is selected from objects made in glass, or plastic materials, such as packages, containers or tires.

Preferably, the so-called "no label look" items consist of plastic material coated with a self-adhesive label wherein the supporting layer consisting of a polymer film is transparent and the self-adhesive label is invisible.

The fifth object of the invention is a method for preparing an item coated with a self-adhesive label comprising:

a) the application at a temperature comprised between 0° C. and 50° C. of a self-adhesive label as defined in claim 8 on a preferably rough surface, the outer surface roughness Ra of which is greater than 0.1 µm, preferably comprised between 2 and 5 µm, b) optionally, in the case of non-compliance of the positioning of the label at the surface of the item in the previous step, manual detachment of this label within a time period of at most 24 hours, and then the recycling of said item not comprising any traces of adhesives at its surface by returning to step a).

Preferably the method allows the preparation of a so-called "no label look" item in which the self-adhesive label is transparent and becomes invisible within at least 10 days, preferably within 1 and 7 days.

The sixth object of the invention is the use of a self-adhesive label as defined above for coating the surface of an item, preferably a plastic package or a tire. Preferably the label used does not have any rolling of the edges (curling), or any edge detachment phenomenon (haloing), within a time period of at least 72 hours.

DETAILED DISCUSSION OF EMBODIMENTS OF THE INVENTION

2. Adhesive Composition, Formulation.

2.1.1 Polymeric Portion (A):

The adhesive composition comprises from 20 to 50%, preferably from 25% to 45% by weight of a polymeric portion (A) comprising a mixture of styrene block copolymers.

The block copolymers which may be used in the HMPSA according to the invention have a weight average molar mass Mw generally comprised between 60 kDa and 400 kDa and consist of blocks of different polymerized monomers. They have a triblock configuration of general formula: A–B–A (I) wherein:

A represents a styrene (or polystyrene) non-elastomeric block, and

B represents a so-called elastomeric block which may be:
  polyisoprene: the block copolymer then has the structure: polystyrene-polyisoprene-polystyrene and the name of SIS;
  polyisoprene-polybutadiene: the block copolymer then has the structure polystyrene-polyisoprene-polybutadiene-polystyrene, and the name of SIPS;
  totally or partly hydrogenated polyisoprene; the block copolymer then has the structure: polystyrene-poly(ethyleneproylene)-polystyrene and the name of SEPS;
  polybutadiene: the block copolymer then has the structure: polystyrene-polybutadiene-polystyrene, and the name of SBS;
  totally or partly hydrogenated butadiene: the block copolymer then has the structure: polystyrene-poly(ethylenebutylene)-polystyrene and the name of SEBS. This SEBS copolymer may optionally have been chemically modified with maleic anhydrides.

These styrene triblock copolymers may be obtained according to methods known per se and are commercially available. The methods for obtaining these commercial products also generally lead to the formation of variable amounts of diblock compounds of formula A-B. Thus, in the sense of the present text, the terms of SIS, SIBS, SEBS, SEPS and SBS in fact designate mixtures of triblocks and diblocks. The amount of diblocks may vary without any disadvantage from 0 to 80% on the basis of the total weight of styrene copolymers. In addition to the linear structure of formula (I), the triblock styrene copolymers which may be used in the HMPSA according to the invention may also have a radial structure.

It is of course understood that the styrene block copolymers included in the HMPSA according to the invention which are selected from the group comprising SIS, SBS, SIBS, SEBS, SEPS may belong to only one or several of these five families of copolymers.

The amount of styrene block may, as for it, vary within wide limits, such as for example from 10% to 15% (on the basis of the total weight of block copolymers).

Mention may be made of commercial products as examples:
  of a linear SIS: Vector® 4111 from Exxon Mobil (with a diblock content of 0% and a styrene content of 19%), Kraton® D1113 (56% of diblock and 16% of styrene);
  of radial SIS, Kraton® D1124 (29% diblock and 30% styrene), Vector® DPX 586 (80% of diblock and 18% of styrene) from Exxon Mobil;
  of SIBS: Kraton® MD 6455 (35% of diblock and 18% of styrene);
  of SBS: Europrene® Sol T 166 (10% of diblock and 30% of styrene) from Polimeri Europa (Italy), Stereon® 840A from Firestone; Kraton® D1118 (75% of diblocks and 30% of styrene); Solprene® 1205 from Dynasol (100% of diblocks);
  of SEBS: Kraton® G1726 (70% of diblock and 30% of styrene) Kraton® G1924 (30% of diblock and 13% of styrene) is an SEBS grafted with 1% of maleic anhydride.

1.2 Resin Portion B) and C):

The adhesive composition comprises from 50 to 80% preferably from 55 to 75% by weight of a resin portion consisting of a liquid portion B and of a solid portion C.

Portion (B):

The liquid portion B) accounts for 25 to 100%, preferably 50 to 80% by weight of the B+C mixture and has a minimum softening point in the range from −10° C. to 50° C., preferably comprised between 5° C. and 20° C., a softening point measured either according to the ASTM E 28 standard for the range from 20° C. to 50° C., or by the DSC (Differential Scanning calorimetry) method for the range from −10° C. to 20° C. This liquid portion comprises a portion (B1) comprising one or more tackifying resins selected from liquid polar compounds, optionally mixed with (B2) comprising at least one polar oil, preferably a benzoate oil.

The portion B1 comprises tackifying resins which have number average molar masses by weight $M_n$ generally comprised between 200 and 5,000 and are specifically selected from solid or liquid polar compounds. As examples, mention may be made of polar products, rosins of natural origin or modified, such as for example rosin extracted from gum of pines, wood rosin extracted from the roots of the tree and their hydrogenated, de-hydrogenated, dimerized, polymerized derivatives or esterified with mono-alcohols or polyols such as glycerols.

As liquid resins mention may be made of Sylvatac® RE 12 from Arizona Chemicals with a softening point located around 12° C., and further Staybelite® ester 3E from Eastman with a softening point located around 10° C.

The B2 portion comprises at least one polar oil, preferably a benzoate oil such as for example Benzoflex® 2088 from Velsicol or a phthalate-based oil such as Di Iso Nonyl Phthalate. This B2 portion may be completed with one or several hydrocarbon apolar oils of the naphthene or paraffin type, such as a paraffin or naphthene oil like Primol® 352 from Esso.

When the tackifying resin(s) B1 are selected from resins for which the softening temperature is high, it may be useful to mix them with a polar oil for example comprising at least one benzoate oil in order to obtain a liquid mixture for which the softening temperature is comprised between −10° C. and 50° C.

According to a preferred embodiment, when the tackifying resin(s) of the portion B1 is(are) selected from polar liquid resins, such as for example rosin-based resins for which the softening temperature is comprised between 0° C. and 50° C., it is unnecessary to mix them with an oil of the B2 type.

In particular the liquid portion comprising (B1) will be preferred, comprising one or more tackifying resins selected from liquid polar compounds based on rosins and on their ester derivatives of rosins, optionally in a mixture with (B2) comprising at least one benzoate oil, optionally supplemented with one or more apolar hydrocarbon oils of the naphthene or paraffin type. Advantageously, it will be preferred that the liquid portion B only consists of the portion B1 comprising one or more tackifying resins selected from polar liquid compounds based on resins or on their ester derivatives of rosins.

Portion (C):

The solid portion C) accounts for 0 to 75%, preferably 20 to 50% by weight of the B+C mixture and has a softening point measured according to the ASTM E 28 standard above 70° C., preferably comprise between 90 and 150° C., and consists of one or more polar or apolar solid tackifying resins.

The B+C portion globally comprises from 0 to 40%, preferably from 5 to 35% by weight of apolar resin, and from 60% to 100%, preferably from 65 to 95% by weight of polar resin.

Within the scope of the portion C of the composition, the selected polar or apolar solid tackifying resin(s) has(have) number average molar masses by weight $M_n$ generally comprised between 300 and 5,000 and are notably selected from:

polar resins such as:
(i) rosins of natural origin or modified, such as for example rosin extracted from gum of pines, wood rosin extracted from the root of the tree and their hydrogenated, dehydrogenated, dimerized, polymerized derivatives or esterified with mono-alcohols or polyols such as glycol, glycerol, pentaerythritol.
(ii) terpene resins generally resulting from the polymerization of terpene hydrocarbons in the presence of Friedel-Crafts catalysts such as for example mono-terpene (or pinene), alpha-methyl styrene, and modified by the action of phenols; the latter are preferred and represent the polar resins within the scope of the preferred HMPSA;

apolar resins such as:
(iii) the resins obtained by hydrogenation, polymerization or copolymerization (with an aromatic hydrocarbon) of mixtures of unsaturated aliphatic hydrocarbons having about 5, 9 or 10 carbon atoms stemming from petroleum cuts;
(iv) terpene resins generally resulting from the polymerization of terpene hydrocarbons in the presence of Freidel-Crafts catalysts such as mono-terpene (or pinene), copolymers based on natural terpenes, for example styrene-terpene, alpha-methyl-styrene-terpene, and vinyl-toluene-terpene copolymers.

These resins are commercially available and among those having a softening temperature comprised between 80 and 150° C., mention may be made for example in the categories above, of the following products:
(i) Sylvalite® RE 100S from Arizona Chemical, Dertoline® G2L, Dertopoline® CG from the French company DRT, Foral® AX-E from Eastman.
(ii) Dertophene® T from DRT; Sylvarez® TP95 from Arizona Chemical which is a phenolic terpene resin with a softening temperature of 95° C. and an $M_W$ of about 1,120 Da.
(iii) Escorez® 5600 (5615 respectively) available from Exxon Chemicals which is a hydrogenated dicyclopentadiene resin modified by an aromatic compound having a softening temperature of 100° C. (respectively 120° C.) and an $M_W$ of about 980 Da; Escorez® 5400 also from Exxon Chemicals with a softening temperature of 100° C.; Wingtack® Extra from Cray-Valley; Regalite® R5100 from Eastman;
(iv) Sylvarez® ZT 105 LT from Arizona Chemical which is a styrene-terpene copolymer with a softening point of 105° C., Norselene® W100 from Cray Valley have a softening point of 100° C.

The tackifying resins used in the adhesive composition are said to be compatible, i.e. a tackifying resin which, when it is mixed in 50%/50% proportions with a selected styrene block copolymer (SIS or SBS) gives a substantially homogeneous mixture.

The tackifying resins having a softening temperature comprised 95 and 130° C. are preferred, such as for example Escorez® 5600 or 5615.

1.3 Other Additives.

The composition used in the invention may also include a wax from a polyethylene homopolymer (such as A-C® 8 from Honeywell), or a wax of a copolymer of polyethylene and vinyl acetate, preferably in an amount ranging from 0 to 5% by weight of the adhesive composition.

A 0.1-3% amount of one or more stabilizers (or antioxidant) is further preferably included in the composition of the invention. These compounds are introduced in order to protect the composition from degradation resulting from a reaction with oxygen which is capable of forming under the action of heat, light or residual catalysts on certain raw materials such as tackifying resins. These compounds may include primary antioxidants which trap the free radicals and are generally substituted phenols such as Irganox® 1010 from CIBA or Sumilizer® GS. The primary antioxidants may be used alone or in combination with other antioxidants such as sulfites like Irganox® PS800 also from CIBA, or further with UV stabilizers such as Tinuvin® 328.

4. Preparation of the Adhesive Composition.

The hot melt self-adhesive composition according to the invention is prepared by simply mixing its components at a temperature comprised between 130 and 200° C., until a homogeneous mixture is obtained. The required mixing techniques are well known to one skilled in the art.

5. Properties of the Adhesive Composition.

The hot melt self-adhesive composition according to the invention belongs to the category of permanent adhesives having an adhesion coefficient such that they have the feature of defibrating 70 g vellum paper on which the label (once it is coated with the adhesive) defibrates this paper after having been deposited for 20 minutes.

The adhesive composition has a measured initial adhesiveness according to the FINAT no. 1 standard by peeling on glass, of greater than or equal to 2.5N/cm. This adhesiveness may increase over time so as to become greater than or equal to 3N/cm beyond 24 hours or even 36 hours. Thus, within a time period of less than 36 hours, a label adhered on a support via the adhesive composition according to the invention remains detachable from the support manually without there remaining any trace of adhesive on the support.

4. Multilayer System.

The object of the present invention is also a multilayer system comprising:
an adhesive layer consisting of the pressure sensitive hot melt adhesive composition according to the invention, notably the preferred HMPSA;
a printable supporting layer adjacent to said adhesive layer, consisting of a non-porous material either transparent or not, preferably a polymeric film with one or more layers;
a protective layer adjacent to said adhesive layer.

The adhesive layer which covers the printable supporting layer is itself covered with a protective layer (often designated as "the release liner"), for example consisting of silicone film or paper. The multilayer system obtained is generally conditioned by winding it up in the form of wide reels having a width of up to 2 meters and a diameter of 1 meter, which may be stored and transported.

The supporting layer may include a so-called "barrier" coated layer on the face to be adhered. This coating, such as for example acrylic polymers, generally has the purpose of preventing migration of the components of the adhesive into the film and of avoiding curling phenomena. But this additional treatment has a non-negligible cost on the film price.

According to a preferred embodiment, the use of a "single layer" film of the OPP or PE type not having any barrier layer on the face to be adhered is preferred as a printable supporting layer. This allows a reduction in the total cost of the label.

The HMPSA according to the invention is applied in the molten state at a temperature above 120° C. on the protective layer (release liner) and transferred in line onto the printable support in an amount comprised between 10 and 70 g/m² in order to form the adhesive layer. The adhesive amount is defined according to the desired thickness once it is applied on the final support and in connection with the surface condition of the targeted support.

The application is carried out by known coating techniques such as for example the coating technique of the lip nozzle type (at a temperature of about 160 to 180° C.) or of the curtain type (at a temperature of about 120 to 180° C.). Application of the HMPSA by a lip nozzle is generally carried out on the protective layer, the whole then being laminated on the supporting layer (coating by transfer). The application of the HMPSA by coating of the curtain type may be directly carried out on the supporting layer depending on the coating temperature.

In the case of a single layer film without any barrier layer, printing may be accomplished on the face where the adhesive will be deposited. This technique allows the print of the label to be better protected against scratching.

5. Self-Adhesive Label:

The invention also relates to a self-adhesive label which may be obtained by transformation of the multilayer system as described earlier. The applied transformation method generally comprises at least one cutting step with a printing step beforehand on the printable supporting layer if the printing has not already been accomplished on the supporting layer upon preparing the multilayer system. The cutting-out step is then followed by a step for putting them on rolls for storing the labels.

The self-adhesive label according to the invention comprises an amount of adhesive at the surface of the support which ranges from 10 to 70 g/m², preferably from 15 to 25 g/m².

6. Labeled Item:

The object of the invention is also an item coated with said label.

The labeled item according to the invention is preferably an object (package or container) consisting of glass or of a customary plastic material selected from PolyEthylene Terephthalate (PET), PolyVinyl Chloride (PVC), PolyEthylene (PE) or PolyPropylene (PP), polycarbonates, Acrylonitrile-Butadiene-Styrene copolymers (ABS), polymethyl methacrylates (PMMA).

According to another preferred embodiment, the coated item may be a tire for any type of vehicle.

6.1 Measurement of the Surface Condition of an Item:

Within the scope of the invention, the external surface condition of an item is defined by its roughness Ra measured by 3D interferometric microscopy according to the method described in the examples.

Indeed, the relevant objects, depending on their surface treatment or their composition, may have highly diversified surface roughness. For example plastic containers, the composition of which comprises more or less pigment may have surface roughness ranging from a surface described as smooth to a surface described as rough.

According to the method by interferometric microscopy, a smooth surface material is represented by a Ra of less than or equal to 1 µm, preferably from 0.1 µm to 1 µm. Among the final materials with a smooth surface, mention may be made of PET flasks which do not contain any pigment and are obtained by a blowing method.

According to the method by interferometric microscopy, a material with a rough surface is represented by an Ra strictly greater than 1 µm, preferably comprised between 1.5 µm and 5 µm. Among materials with a rough surface, mention may be made of pigmented non-transparent PP flasks.

When the label is deposited on the item, the adhesive should spread out without any stresses or pressure and impregnate this surface so as to remove air bubbles or voids which may remain at the surface of the item. These defects should absolutely be removed within a period of time compatible with the manufacturing and delivery process in order to finally obtain an item on which the transparent label is invisible. This impregnation time called the "wet out" time depends on the physical parameters of the adhesive composition used, like its viscosity, its surface energy, its cohesion, its rheology, or its polarity.

Thus, with the adhesive composition according to the invention, this "wet out" time is less than 10 days, preferably between 3 and 5 days, whatever the roughness level of the support.

Within the scope of the invention, all the items, regardless of their surface roughness and coated with the self-adhesive label described above do not exhibit any curling or edge rolling phenomena before labeling, or any edge detachment phenomenon, so-called "haloing", after labeling during the whole duration of the tests. This advantage is more particularly observed upon labeling plastic or glass flasks and also during the labeling of tire treads.

Further, when the layer supporting the label is a transparent polymeric film, the self-adhesive label becomes invisible once it is applied on the surface of an item, preferably in plastic, regardless of its level of roughness and a so-called "no label look" item is obtained in less than 10 days.

According to a particularly advantageous embodiment, the self-adhesive label becomes visible in between 1 and 7 days even when it is applied on the surface of a very rough plastic item i.e. the surface of which has a roughness of more than 1 µm and preferably comprised between 1.5 and 5 µm.

According to a more preferred embodiment, with the adhesive according to the invention, one manages to retain the label-holding and invisibility properties described above with reduced amounts of adhesive comprised between 15 and 30 g/m² or preferably 15 and 25 g/m² and this in particular when the label is applied on a rough support.

Within the scope of the invention, the self-adhesive label is applied to the surface of an item preferably filled with the product to be marketed. In the case of non-compliant application of the label on the item, it is possible to manually detach this label without damaging the adhered support and without leaving any trace of adhesive within the maximum time period of 36 hours, in order to recycle the item in the labeling process.

7. Preparation Method and use.

The method for preparing an item coated with a self-adhesive label comprises:

a) at a temperature comprised between 0° C. and 50° C., applying a self-adhesive label as defined above on a preferably rough surface, in particular the external surface roughness Ra of which is comprised between 2 and 5 µm.

b) optionally, in the case of non-compliance of the positioning of the label at the surface of the item in the previous step, manually detaching this label within a time period of at most 24 hours, and then recycling said item not comprising any traces of adhesives at its surface by returning to step a).

Preferably the method allows the preparation of a so-called "no label look" item in which the self-adhesive label is transparent and becomes invisible in less than 10 days, preferably within 1 and 7 days.

The object of the invention is also the use of a self-adhesive label as defined above for coating the surface of an item, preferably a plastic package or a tire. Preferably, the label used does not exhibit any rolling of the edges (curling), or any edge detachment phenomena (haloing), within a time period of at least 72 hours.

8. Evaluation of the Performances.

8.1. Measurement of Viscosity of the Adhesive Compositions.

The viscosities are measured with a Brookfield RVT type viscometer according to the ASTM D 3236 standard.

8.2. R&B Measurement.

The softening points of the solid resins, which are above 20° C., are measured by the ball and ring method according to the ASTM E 28 method. The principle is the following. A brass ring with a diameter of about 2 cm is filled with the resin to be tested in the molten state. After cooling to room temperature, the ring and the solid resin are placed horizontally in a thermostatic glycerine bath, the temperature of which may vary by 5° C. per minute. A steel ball of a diameter of about 9.5 mm is centered on the solid resin disc. The softening temperature, during the phase for rising the temperature of the bath at a rate of 5° C. per minute, is the temperature at which the resin disc flows from a height of 25.4 mm under the weight of the ball.

The softening points of the resins which are comprised between −10° C. and 20° C. are measured by the DSC (Differential Scanning calorimeter) method. The principle is the following. The measurement is conducted upon rising the temperature at a rate of 10° C./min of the sample after having erased the thermal memory of the product. We obtain an endotherm (inverted) curve and the melting temperature is the extremum of this curve.

8.3. Measurement of "Curling".

Curling is visually measured before setting a label of dimensions 10 cm×10 cm into place on a glass or metal mandrel with a diameter of 5 mm. The label without its protective support is stuck with its centre exposed and tangentially on this mandrel. The mandrel is attached on a support so that the label is positioned without any stress along a vertical plane. The whole is positioned in an air-conditioned room at 23° C./50% of humidity and it is checked that the label is properly flat initially. The whole is left for 48 hours and possible warping of the label is noted. If the measured warping angle is less than about 5° it is noted that it does not have any curling.

8.4. Measurement of "Haloing".

Haloing is visually measured by placing a label with a rectangular shape 7 cm×10 cm with round angles (diameter 1 cm) on flasks with a radius of curvature of 10 cm. The label is cut out automatically under industrial conditions and manually adhered onto these flasks. The flasks are stored for 24 hours at 23° C./50% relative humidity, then stored in an oven for 48 hours at 40° C. At the end of the test, it is noted whether there is any detachment of the edges or not.

8.5. Measurement of "Wet Out" Time.

The "wet out" time is measured with flasks having known and measured roughness. A surface label of 10 cm×5 cm is manually adhered or automatically on this flask. Slight pressure is exerted in order to purge the possible air bubbles. The labeled flask is thus stored in an air-conditioned room at 23° C./50% humidity. Every 24 hours, a visual check of the transparency is carried out. Once the transparency check is complete, the test is stopped and the wetting time or "wet out" time is noted.

8.6. Measurement of Adhesion.

Peeling Test

The adhesiveness of the HMPSA according to the invention is evaluated by the peeling test at 180° C. on a glass plate or on HDPE as described in the test method FINAT No. 1, published in the FINAT Technical Manual $6^{th}$ Edition 2001. FINAT is the international confederation of manufacturers and transformers of self-adhesive labels. The principle of this test is the following. The HMPSA is coated beforehand in an amount of 20 g/m2 on the OPP face of a supporting layer consisting of PET film with a thickness of 19 µm which is laminated on an OPP film with a thickness of 50 µm by means of a two-component polyurethane adhesive. A specimen in the form of a rectangular strip (25 mm×175 mm) is cut out in the thereby obtained self-adhesive support. This specimen is attached on a substrate consisting of a glass plate. The obtained assembly is left for 20 min at room temperature. It is then introduced into a traction machine capable of carrying out peeling or detachment of the strip under an angle of 180° and with a separation velocity of 300 mm per minute. The machine measures the required force for detaching the strip under these conditions. The result is expressed in N/cm. 180° peeling on a glass plate of adhesives intended for the manufacturing of self-adhesive labels is generally greater than 2 N/cm, preferably greater than 4 N/cm.

Immediate Tackiness (Looptack) on Glass.

The immediate tackiness or tack of the HMPSA according to the invention is evaluated with the so-called loop instantaneous adhesion test, described in the test method FINAT No. 9, the HMPSA is coated beforehand in an amount of 20 g/m$^2$ on an OPP film with a thickness of 50 µm, in order to obtain a 25 mm by 175 mm rectangular strip. Both ends of the strip are joined so as to form a loop, the adhesive layer being oriented outwards. The two joined ends are placed in the mobile jaw of a traction machine capable of imposing a displacement rate of 300 mm/minute along a vertical axis with the possibility of upward and downward movements. The lower portion of the loop placed in the vertical position is first put into contact with a horizontal glass plate of 25 mm×30 mm on a square area with a side of about 25 mm. As soon as there is contact, the direction of displacement of the jaw is inverted. The immediate tackiness is the maximum value of the force required for completely detaching the loop from the plate. The tackiness of a PSA is generally greater than or equal to 1 N/cm$^2$.

8.8. Measurements of Roughness.

Roughness is qualitatively observable visually in the form of small recesses and bumps by reflection of light on the support.

Roughness is qualitatively measured by using an interferometric microscope such as a Zygo New View according to the method described in the publication of De Goot, P., Colonna de Lega X. C., Kramer, J. and Turzhitsky, M (2002) 'Determination of fringe order in white-light interference microscopy', *Appl. Opt., Vol.* 41, pp. 4571-4578. This apparatus and its associated software reconstructs the whole of the topography of the surface and determines the value of the parameter Ra in 3D as described in the user manual of the Zygo New View 200 apparatus, manual Metropo 1 Reference OMP 0514A revised on 06.2005.

The Ra values for different supports appear in Table II.

EXAMPLES

The following examples aim at illustrating the invention without limiting the scope thereof.

Example 1

Preparation of Adhesive Compositions

The compositions appearing in the following table 1 are prepared by simply hot-mixing the ingredients at 180° C. until a homogeneous mixture is obtained. The required mixing techniques are well known to one skilled in the art.

Formulations C1 to C3 which represent comparative compositions are described in Table 1. These compositions contained in the liquid portion B only an apolar oil which does not allow them to attain the desired non-curling property obtained with the compositions according to the invention. Indeed, formulations C1, C2 give cohesive breakages on glass after 20 minutes according to the FINAT 1 test.

The formulations F4 to F13 of compositions according to the invention are described in Table 1.

The results of the tests on the compositions are indicated in Table II.

The formulations according to the invention give adhesive breakages after 20 minutes and 1 hour which leaves time for recovering the flasks on the labeling line and removing the labels for recycling the flask to labeling. In particular the formulations F6, F7, F8, F9, F 11 and F12 give the possibility of obtaining adhesive breakages after 24 hours with only a slight increase in the peeling over time (about 20%).

TABLE I

| | | | C1 | C2 | C3 | F4 | F5 | F7 | F8 | F9 | F10 | F11 | F12 | F13 |
|---|---|---|---|---|---|---|---|---|---|---|---|---|---|---|
| B | Primol 352 | Paraffinic oil | 20 | 13 | 18 | | | | | | | | | |
| | Sylvatac RE 12 | Rosin ester | | | | | 46 | 46 | 46 | 46 | 46 | 46 | | 36 |
| | Staybelite Ester 3$^E$ | Rosin ester | | | | 31 | | | | | | | 45 | |
| C | Sylvalite RE 100 | Rosin ester on pentaerythritol base R&B 100° C. | | 51 | | 24.5 | | | | | | | | 10 |
| | Forai ÀX-E | | 32 | | 40 | | | | | | | | | |
| | Escorez 5615 | Aromatic modified hydrogenated dicyclopentadiene resin R&B 120° C. | 14.5 | | 10.5 | | 20.5 | 12.5 | 12.5 | 12.5 | 17.5 | 12.5 | | 13.5 |
| | Escorez 5600 | Aromatic modified hydrogenated dicyclopentadiene resin R&B 100° C. | | | | | | | | | | | | 16.5 |
| A | Vector DPX 586 A | Radial SIS with 18% S and 80 diblocks | 32 | | 30 | | 16 | | | | 16 | | | 36 |
| | Solprène 1205 | SB with 17% S, 100% diblocks | | 15 | | | | | 20 | | | | | |
| | TPE 3522 | SBS with 20% S and 75% diblocks | | | | | | 40 | | | | | | |
| | Vector 4111 | Linear SLS with 18% S and 0% diblocks | | | | | 16 | | 20 | 40 | 16 | | 40 | |
| | Kraton D1163 | Linear SIS with 14 % S and 36% diblocks | | 20 | | 43 | | | | | | | | |
| | Kraton D1161 | Linear SIS with 15% S and 20% diblocks | | | | | | | | | | 40 | | |
| Ad | Wax AC8 | PE homopolymer | | | | | | | | | 3 | | | |
| | Irganox PS 800 | Anti-oxidant thiodipropionic acid dialkyl ester | 0.5 | 0.5 | 0.5 | 0.5 | 0.5 | 0.5 | 0.5 | 0.5 | 0.5 | 0.5 | 0.5 | 0.5 |
| | Irganox 1010 | Anti-oxidant phenol tetrakis | 1 | | 1 | 1 | 1 | 1 | 1 | 1 | 1 | 1 | 1 | 1 |

TABLE II

| | | C1 | C2 | C3 | F4 | F5 | F7 | F8 | F9 | F10 | F11 | F12 | F13 |
|---|---|---|---|---|---|---|---|---|---|---|---|---|---|
| Viscosity at 163° C. in mPa·s | | 2500 | 14000 | 2940 | 24000 | 5800 | 20600 | 21500 | 28400 | 8000 | 26200 | 23000 | 15000 |
| R&B ° C. | | 84 | 97 | 80 | 75 | 63 | 67 | 67 | 74 | 77 | 70 | 75 | 67 |
| "wet out" time in days | | | | | | | | | | | | | |
| PET flasks, smooth surface | Ra = 0.1 um | <1 | 2 | <1 | <1 | <1 | <1 | <1 | <1 | <1 | <1 | <1 | <1 |
| PE flasks, smooth surface | Ra = 0.3 nm | <1 | 3 | <1 | <1 | <1 | <1 | <1 | <1 | <1 | <1 | <1 | <1 |
| PE flasks, rough surface | Ra = 3.2 nm | >10 | >10 | 10 | 9 | 3 | 3 | 3 | 4 | 4 | 6 | 6 | 9 |

TABLE II-continued

|  |  | C1 | C2 | C3 | F4 | F5 | F7 | F8 | F9 | F10 | F11 | F12 | F13 |
|---|---|---|---|---|---|---|---|---|---|---|---|---|---|
| PP flasks, smooth surface | Ra = 0.3 nm | <1 | 3 | <1 | <1 | <1 | <1 | <1 | <1 | <1 | <1 | <1 | <1 |
| PP flasks, rough surface | Ra = 2.1 nm | 9 | >10 | 6 | 3 | 2 | 2 | 2 | 2 | 2 | 2 | 2 | 3 |
| Curling test on a 5 × 5 label after 72 hrs at 23° C./50% RH: | | | | | | | | | | | | | |
|  |  | Yes | Yes | Yes | No | No | No | No | No | No | No | No | No |
| Haloing test on a 7 × 10 label with edges after 24 hrs at 23° C. + 50% RH + 48 hrs at 40° C. stuck on a PE flask. | | | | | | | | | | | | | |
|  |  | Slight | Yes | Very slight | No | No | No | No | No | No | No | No | No |
| Technical performances | | | | | | | | | | | | | |
| 180° peeling on glass | N/cm | 4.2 | 8.4 | 4 | 5.2 | 6 | 5.5 | 5 | 3.5 | 5.6 | 4 | 4.1 | 5 |
| 180° peeling on HDPE |  | 4 | 4.8 | 4.1 | 4.8 | 7.1 | 6.8 | 5.2 | 4 | 6.1 | 4.2 | 3.8 | 3.2 |
| loop tack on glass | N/cm$^2$ | 3.8 | 4 | 3.6 | 3.3 | 4.1 | 4 | 4.5 | 3 | 4.1 | 2.4 | 3 | 4 |

The invention claimed is:

1. A pressure sensitive hot melt adhesive composition comprising:
   from 20% to 50% by weight of a polymeric portion A comprising a mixture of block copolymers of:
      i) 10 to 100% by weight of one or more radial or linear triblock copolymers of the Styrene-Butadiene-Styrene (SBS), Styrene-Isoprene-Styrene (SIS), Styrene-Ethylene-Butadiene-Styrene (SEBS), Styrene-Isoprene/Butylene-Styrene (SIBS), Styrene-Ethylene/Propylene-Styrene (SEPS) type, and
      ii) less than 90% by weight of one or more diblock copolymers of the Styrene-Butadiene (SB) or Styrene-Isoprene (SI) or Styrene-Ethylene/Butylene (SEB) or Styrene-Isoprene/Butylene (SIB) or Styrene-Ethylene/Propylene (SEP) type, the overall content of styrene units of said mixture being less than or equal to 35% by mass;
   from 50 to 80% by weight of a resin portion including a liquid portion B and a solid portion C;
   wherein the liquid portion B) accounts for 25 to 100% by weight of the B+C mixture and has a minimum softening point measured according to the ASTM E 28 standard or the DSC method, in the range of −10° C. to 50° C., said liquid portion comprising B1, wherein B1 comprises one or more tackifying resins selected from liquid polar compounds based on rosins or ester derivatives of rosins, optionally in a mixture with B2, wherein B2 comprises at least one benzoate oil, optionally comprising one or more hydrocarbon apolar oils of the naphthene or paraffin type;
   the solid portion C accounts for up to 75% by weight of the B+C mixture and has a softening point measured according to the ASTM E 28 standard, above 70° C., and includes one or more apolar solid tackifying resins or terpene resins;
   said B+C portion comprising from 0 to 40% by weight of apolar resin, and from 60% to 100% by weight of polar resin.

2. The adhesive composition according to claim 1 wherein the solid tackifying resins of portion C comprise apolar resins.

3. The adhesive composition according to claim 1 wherein said portion A accounts for 25% to 45% by weight of the adhesive composition and the portion B+C accounts for 55 to 75% by weight of the adhesive composition.

4. The adhesive of claim 1, wherein the mixtures of the polymeric portion A comprises ii) from 0% to 80% of one or more diblock copolymers of the Styrene-Butadiene (SB) or Styrene-Isoprene (SI) or Styrene Ethylene/Butylene (SEB) or Styrene Isoprene/Butylene (SIB) or Styrene Ethylene/Propylene (SEP) type.

5. The adhesive of claim 1, wherein the overall content of styrene units of the mixture in the polymeric portion A is between 10 and 25% by mass.

6. The adhesive of claim 1, wherein the liquid portion B has a minimum softening point measured according to the ASTM E 28 standard or the DSC method between 5° C. and 20° C.

7. The adhesive of claim 1, wherein the solid portion C has a softening point measured according to the ASTM E 28 standard between 90° C. and 150° C.

8. The adhesive of claim 1, wherein the one or more apolar solid tackifying resins or terpene resins result from the polymerization of terpene hydrocarbons in the presence of Friedel Crafts catalysts, and are modified by the action of phenols.

9. The adhesive of claim 1, wherein the B+C portion comprises from 5 to 35% apolar resins by weight.

10. The adhesive of claim 1, wherein the B+C portion comprises from 65 to 95% polar resins by weight.

* * * * *

UNITED STATES PATENT AND TRADEMARK OFFICE
CERTIFICATE OF CORRECTION

PATENT NO.        : 8,703,263 B2  
APPLICATION NO.   : 13/056949  
DATED             : April 22, 2014  
INVENTOR(S)       : David Goubard Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this

Twenty-ninth Day of September, 2015

Michelle K. Lee
*Director of the United States Patent and Trademark Office*